US006935948B2

(12) United States Patent
Wright

(10) Patent No.: US 6,935,948 B2
(45) Date of Patent: Aug. 30, 2005

(54) MULTIPLE PRICING SHARED SINGLE JACKPOT IN A LOTTERY

(75) Inventor: Robert J. Wright, Irving, TX (US)

(73) Assignee: Integrated Group Assets, Inc., Irving, TX (US)

( * ) Notice: Subject to any disclaimer, the term of this patent is extended or adjusted under 35 U.S.C. 154(b) by 54 days.

(21) Appl. No.: 10/766,676

(22) Filed: Jan. 27, 2004

(65) Prior Publication Data

US 2005/0164768 A1    Jul. 28, 2005

(51) Int. Cl.[7] .............................................. A63F 13/00
(52) U.S. Cl. ...................... 463/17; 463/26; 273/138.1; 273/139
(58) Field of Search ........................ 463/16–19, 25–28; 273/269, 138.1, 139

(56) References Cited

U.S. PATENT DOCUMENTS

| | | | |
|---|---|---|---|
| 4,652,998 A | | 3/1987 | Koza et al. |
| 5,083,784 A | | 1/1992 | Nilssen |
| 5,282,620 A | * | 2/1994 | Keesee .................... 463/20 |
| 5,286,023 A | | 2/1994 | Wood |
| 5,380,007 A | | 1/1995 | Travis et al. |
| RE35,864 E | | 7/1998 | Weingardt |
| 5,851,149 A | | 12/1998 | Xidos et al. |
| 6,017,032 A | * | 1/2000 | Grippo et al. ........... 273/138.1 |
| 6,168,521 B1 | | 1/2001 | Luciano et al. |
| 6,296,569 B1 | * | 10/2001 | Congello, Jr. ............... 463/17 |
| 6,416,408 B2 | | 7/2002 | Tracy et al. |
| 6,527,175 B1 | | 3/2003 | Dietz et al. |
| 6,554,710 B1 | | 4/2003 | Olson |
| 6,572,106 B2 | | 6/2003 | Alexoff |
| 6,648,753 B1 | | 11/2003 | Tracy et al. |
| 6,692,354 B2 | | 2/2004 | Tracy et al. |

(Continued)

OTHER PUBLICATIONS

McQueen, Patricia A. "Lotteries offer add-on games attached to existing online options."*International Gaming & Wagering Business*, Apr. 2004, pp. 22, 26-27.

*Primary Examiner*—Jessica Harrison
*Assistant Examiner*—Alex F. R. P. Rada, II
(74) *Attorney, Agent, or Firm*—Greenberg, Traurig, LLP; Samuel K. Simpson, Esq.

(57) ABSTRACT

A method of multiple pricing for a predetermined single jackpot in a single lottery game is disclosed. For instance, a lottery ticket that is purchased for one dollar can result in a ten million dollar win, a lottery ticket that is purchased for two dollars can result in a twenty million dollar win, a lottery ticket that is purchased for three dollars can result in a thirty million dollar win, etc. Further, different winnings increments can be used. For instance, the three dollar ticket can result in a forty million dollar win. In addition, the lottery prize can be a variable prize that progressively increases with a percentage of each ticket sold. The prizes are won from a single pool. For instance, even if the revenues for the one dollar ticket do not cover the ten million dollar prize, the combined revenues of the one dollar and the two dollar tickets are likely to cover the ten million dollar prize and vice versa. In one embodiment, a shared multiple pricing lottery game with a single pre-determined jackpot is disclosed.

19 Claims, 7 Drawing Sheets

U.S. PATENT DOCUMENTS

| | | |
|---|---|---|
| 2003/0003984 A1 | 1/2003 | Petruzzi |
| 2003/0045339 A1 * | 3/2003 | Ghela .......................... 463/17 |
| 2003/0069059 A1 | 4/2003 | Stanek |
| 2003/0186735 A1 | 10/2003 | Byrne |
| 2003/0190959 A1 | 10/2003 | Olson |
| 2003/0232651 A1 | 12/2003 | Huard et al. |
| 2004/0116176 A1 * | 6/2004 | Tulley et al. ................. 463/17 |
| 2004/0173965 A1 | 9/2004 | Stanek |

* cited by examiner

MULTIPLE PRICING SHARED SINGLE JACKPOT IN A LOTTERY

RELATED APPLICATIONS

This application is related to A System and Method of Providing a Guarantee in a Lottery by Robert J. Wright, which is hereby incorporated by reference in its entirety.

BACKGROUND

1. Field

A system and method are disclosed which generally relate to lotteries.

2. General Background

A lottery is generally a distribution of tokens such that a subset of the distributed tokens may win a prize. The token can be in the form of a ticket. One of the most popular forms of lottery involves the distribution of lottery tickets. Each lottery ticket includes a lottery number. After the lottery tickets have been distributed to the lottery ticket holders, the winning number is chosen. The usual method of selecting the winning number involves a random selection of the winning number. A random number generator can be used to randomly select the winning number. Some lottery systems require the ticket to have the entire number that is randomly selected while other lottery systems require the ticket to have a superset of an ordered sequence of numbers that are randomly selected.

Lotteries are normally used by jurisdictions according to a pari-mutuel model in which the prize is funded by a portion of the ticket sales. One potential problem with the pari-mutuel model is that a sufficient number of tickets need to be sold in order to provide a reasonable lottery prize. However, interest in purchasing lottery tickets is generally stimulated only when the prize becomes substantial. For instance, a large number of lottery tickets are purchased in a $10 million dollar lottery, but a disproportionately large number of lottery tickets are purchased in a $50 million dollar lottery.

In addition, traditional lotteries sell tickets for one price. If there are multiple winners of a jackpot, the winners split the jackpot prize.

SUMMARY

A method is disclosed for providing a multi-priced shared lottery. The method provides a first price category in which a plurality of first price category lottery tickets can be purchased. The first price category indicates a first percentage of a prize that can be won with lottery tickets in the plurality of first price category lottery tickets having a winning lottery number. The method also provides a second price category in which a plurality of second price category lottery tickets can be purchased. The second price category ticket indicates a second percentage of the prize that can be won with lottery tickets in the plurality of second price category lottery tickets having the winning number. Further, the prize includes at least a portion of the revenue provided from the plurality of the first price category lottery tickets and at least a portion of the revenue provided from the plurality of the second price category lottery tickets. The method also randomly selects the winning lottery number.

The method also provides a first price category intra-shared distribution of the first percentage of the prize if at least one of the lottery tickets in the plurality of first price category lottery tickets has a winning number, wherein the first category is the only price category having a winning ticket. Each of the winning tickets in the plurality of first price category lottery tickets shares the first percentage of the prize according to a first price category intra-sharing distribution formula.

In addition, the method provides a second price category intra-shared distribution of the second percentage of the prize if at least one of the lottery tickets in the plurality of second price category lottery tickets has a winning number. The second category is the only price category having a winning ticket. Each of the winning tickets in the plurality of second price category lottery tickets shares the second percentage of the prize according to a second price category intra-sharing distribution formula.

The method also provides a divided first price category intra-shared distribution of the first percentage of the prize, a divided second price category intra-shared distribution of the second percentage of the prize, and an inter-shared distribution of the first percentage of the prize if at least one of the lottery tickets in the plurality of first price category lottery tickets has a winning number and if at least one of the lottery tickets in the plurality of second price category lottery tickets has a winning number. Each of the winning tickets in the plurality of first price category lottery tickets shares the first percentage of the prize according to the divided first price category intra-sharing distribution formula. Further, each of the winning tickets in the plurality of second price category lottery tickets shares the second percentage of the prize according to the divided second price category intra-sharing distribution formula. In addition, each of the winning tickets in the plurality of the second price category lottery tickets shares the first percentage of the prize with each of the winning tickets in the plurality of the first price category lottery tickets according to an inter-sharing distribution formula.

In another aspect, the method provides a third price category intra-shared distribution of the third percentage of the prize if at least one of the lottery tickets in the plurality of third price category lottery tickets has a winning number. The third price category is the only price category having a winning ticket. Further, each of the winning tickets in the plurality of third price category lottery tickets shares the third percentage of the prize according to a third price category intra-sharing distribution formula.

In yet another aspect, the method provides the divided first price category intra-shared distribution of the first percentage of the prize, the divided second price category intra-shared distribution of the second percentage of the prize, the divided third price category intra-shared distribution of the third percentage of the prize, and the inter-shared distribution of the first percentage of the prize if at least one of the lottery tickets in the plurality of first price category lottery tickets has a winning number, if at least one of the lottery tickets in the plurality of second price category lottery tickets has a winning number, and if at least one of the lottery tickets in the plurality of third price category lottery tickets has a winning number. Each of the winning tickets in the plurality of first price category lottery tickets shares the first percentage of the prize according to the divided first price category intra-sharing distribution formula. Further, each of the winning tickets in the plurality of second price category lottery tickets shares the second percentage of the prize according to the divided second price category intra-sharing distribution formula. In addition, each of the winning tickets in the plurality of third price category lottery tickets shares the third percentage of the prize according to the divided third price category intra-sharing distribution formula. Each of the winning tickets in the plurality of the second price category lottery tickets and each of the winning tickets in the plurality of the third price category lottery tickets shares the first percentage of the prize with each of the winning tickets in the plurality of the first price category lottery tickets according to a first triplet inter-sharing distribution formula. In addition, each of the winning tickets in the plurality of the third price category lottery tickets shares the second percentage of the prize with each of the winning tickets in the plurality of the second price category lottery tickets according to a second triplet inter-sharing distribution formula.

In another aspect, a method is disclosed for providing a multi-priced shared lottery. The method provides a first price category in which a plurality of first price category lottery tickets can be purchased. The first price category indicates a first percentage of a prize that can be won with lottery tickets in the plurality of first price category lottery tickets having a winning lottery number. The method also provides a second price category in which a plurality of second price category lottery tickets can be purchased. The second price category ticket indicates a second percentage of the prize that can be won with lottery tickets in the plurality of second price category lottery tickets having the winning number. Further, the prize includes at least a portion of the revenue provided from the plurality of the first price category lottery tickets and at least a portion of the revenue provided from the plurality of the second price category lottery tickets. The method also randomly selects the winning lottery number.

The method also provides a first price category intra-shared distribution of the first percentage of the prize if at least one of the lottery tickets in the plurality of first price category lottery tickets has a winning number, wherein the first category is the only price category having a winning ticket. Each of the winning tickets in the plurality of first price category lottery tickets shares the first percentage of the prize according to a first price category intra-sharing distribution formula.

In addition, the method provides a second price category intra-shared distribution of the second percentage of the prize if at least one of the lottery tickets in the plurality of second price category lottery tickets has a winning number. The second category is the only price category having a winning ticket. Each of the winning tickets in the plurality of second price category lottery tickets shares the second percentage of the prize according to a second price category intra-sharing distribution formula.

In yet another aspect, a method is disclosed for providing a multi-priced shared lottery. The method provides a first price category in which a plurality of first price category lottery tickets can be purchased. The first price category indicates a first percentage of a prize that can be won with lottery tickets in the plurality of first price category lottery tickets having a winning lottery number. The method also provides a second price category in which a plurality of second price category lottery tickets can be purchased. The second price category ticket indicates a second percentage of the prize that can be won with lottery tickets in the plurality of second price category lottery tickets having the winning number. Further, the prize includes at least a portion of the revenue provided from the plurality of the first price category lottery tickets and at least a portion of the revenue provided from the plurality of the second price category lottery tickets. The method also randomly selects the winning lottery number.

The method also provides a first price category intra-shared distribution of the first percentage of the prize if at least one of the lottery tickets in the plurality of first price category lottery tickets has a winning number, wherein the first category is the only price category having a winning ticket. Each of the winning tickets in the plurality of first price category lottery tickets shares the first percentage of the prize according to a first price category intra-sharing distribution formula.

In addition, the method provides a second price category intra-shared distribution of the second percentage of the prize if at least one of the lottery tickets in the plurality of second price category lottery tickets has a winning number. The second category is the only price category having a winning ticket. Each of the winning tickets in the plurality of second price category lottery tickets shares the second percentage of the prize according to a second price category intra-sharing distribution formula.

Further, the method provides a guarantee of payment of the first price category intra-shared distribution and a guarantee of payment of the second price category intra-shared distribution. The guarantee is in exchange for a stipulation of a percentage of ticket sales revenue from the first price category lottery tickets and from the second price category lottery tickets. Further, the providing the guarantee occurs prior to ticket sales in the lottery. Finally, a percentage of ticket sales revenue is received.

In another aspect, a multi-priced shared lottery system is disclosed. A first price category module provides a first price category in which a plurality of first price category lottery tickets can be purchased. The first price category indicates a first percentage of a prize that can be won with lottery tickets in the plurality of first price category lottery tickets having a winning lottery number. Further, the second price category module provides a second price category in which a plurality of second price category lottery tickets can be purchased. The second price category ticket indicates a second percentage of the prize that can be won with lottery tickets in the plurality of second price category lottery tickets having the winning number. The prize includes at least a portion of the revenue provided from the plurality of the first price category lottery tickets and at least a portion of the revenue provided from the plurality of the second price category lottery tickets. In addition, a random number selection module randomly selects the winning lottery number.

Further, a first price intra-shared distribution module provides a first price category intra-shared distribution of the first percentage of the prize if at least one of the lottery tickets in the plurality of first price category lottery tickets has a winning number. In addition, the first category is the only price category having a winning ticket. Further, each of the winning tickets in the plurality of first price category lottery tickets shares the first percentage of the prize according to a first price category intra-sharing distribution formula.

In addition, a second price category intra-shared distribution module provides a second price category intra-shared distribution of the second percentage of the prize if at least one of the lottery tickets in the plurality of second price category lottery tickets has a winning number. The second category is the only price category having a winning ticket. Each of the winning tickets in the plurality of second price category lottery tickets shares the second percentage of the prize according to a second price category intra-sharing distribution formula.

In one aspect, a divided first price category intra-shared distribution module provides a divided first price category intra-shared distribution of the first percentage of the prize, a divided second price category intra-shared distribution module provides a divided second price category intra-shared distribution of the second percentage of the prize, and an inter-shared distribution module provides an inter-shared distribution of the first percentage of the prize if at least one of the lottery tickets in the plurality of first price category lottery tickets has a winning number and if at least one of the lottery tickets in the plurality of second price category lottery tickets has a winning number. Each of the winning tickets in the plurality of first price category lottery tickets shares the first percentage of the prize according to the divided first price category intra-sharing distribution formula. Further, each of the winning tickets in the plurality of second price category lottery tickets shares the second percentage of the prize according to the divided second price category intra-sharing distribution formula, Further, each of the winning tickets in the plurality of the second price category lottery tickets shares the first percentage of the prize with each of the winning tickets in the plurality of the first price category lottery tickets according to an inter-sharing distribution formula.

In another aspect, a third price category intra-shared distribution module provides a third price category intra-shared distribution of the third percentage of the prize if at least one of the lottery tickets in the plurality of third price category lottery tickets has a winning number. Further, the third price category is the only price category having a winning ticket. In addition, each of the winning tickets in the plurality of third price category lottery tickets shares the third percentage of the prize according to a third price category intra-sharing distribution formula.

In another aspect, a divided third price category intra-shared distribution module provides a divided third price category intra-shared distribution of the third percentage of the prize, if at least one of the lottery tickets in the plurality of first price category lottery tickets has a winning number, if at least one of the lottery tickets in the plurality of second price category lottery tickets has a winning number, and if at least one of the lottery tickets in the plurality of third price category lottery tickets has a winning number. The inter-shared distribution module provides an inter-shared distribution of the first percentage of the prize. Further, each of the winning tickets in the plurality of first price category lottery tickets shares the first percentage of the prize according to the divided first price category intra-sharing distribution formula. In addition, each of the winning tickets in the plurality of second price category lottery tickets shares the second percentage of the prize according to the divided second price category intra-sharing distribution formula. Further, each of the winning tickets in the plurality of third price category lottery tickets shares the third percentage of the prize according to the divided third price category intra-sharing distribution formula. Each of the winning tickets in the plurality of the second price category lottery tickets and each of the winning tickets in the plurality of the third price category lottery tickets shares the first percentage of the prize with each of the winning tickets in the plurality of the first price category lottery tickets according to a first triplet inter-sharing distribution formula. Further, each of the winning tickets in the plurality of the third price category lottery tickets shares the second percentage of the prize with each of the winning tickets in the plurality of the second price category lottery tickets according to a second triplet inter-sharing distribution formula.

BRIEF DESCRIPTION OF THE DRAWINGS

By way of example, reference will now be made to the accompanying drawings.

DETAILED DESCRIPTION OF THE INVENTION

Figure 1:
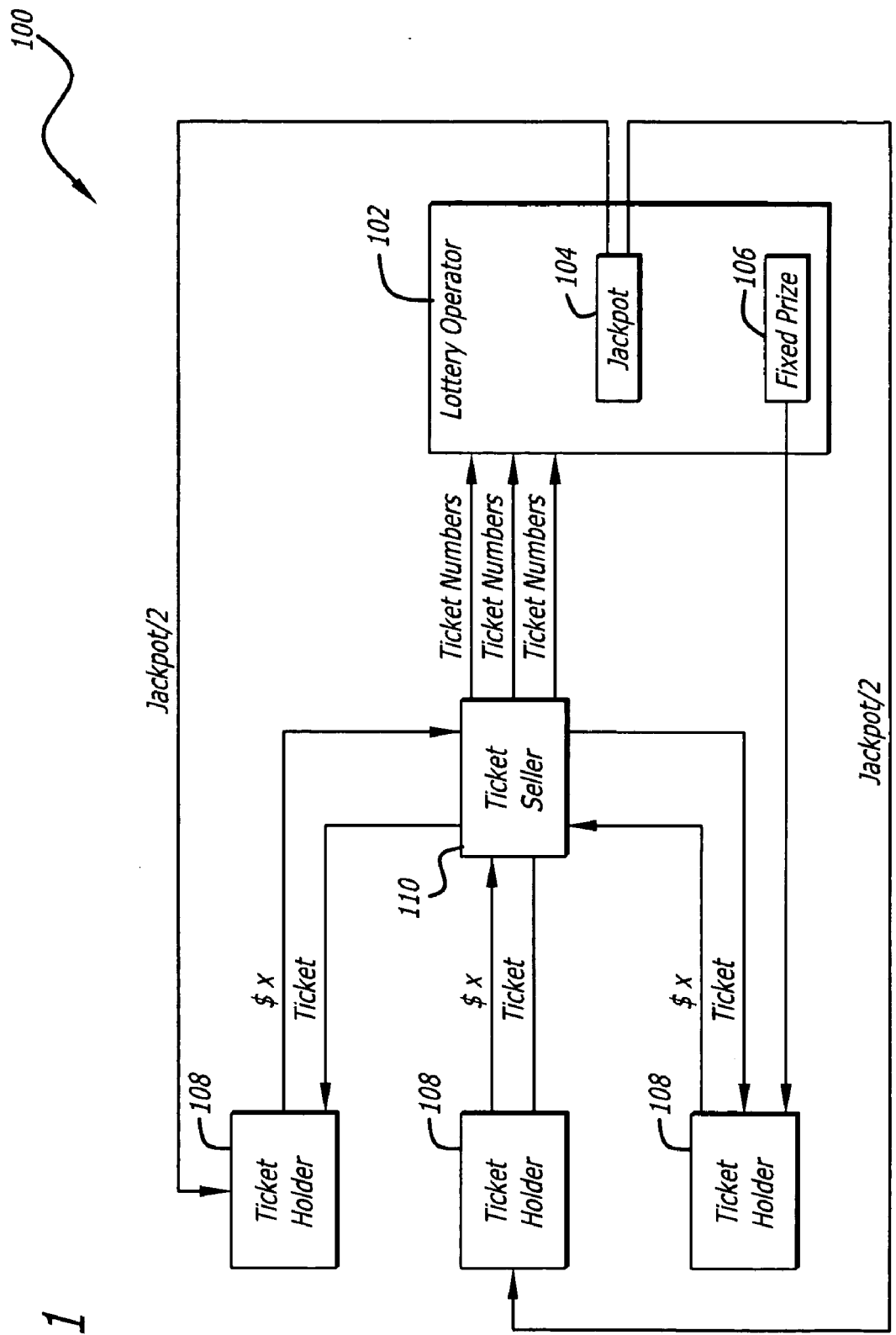
FIG. 1 illustrates a single priced lottery system that is based on a pari-mutuel model.

A method of multiple pricing for a predetermined single jackpot in a single lottery game is disclosed. For instance, a lottery ticket that is purchased for one dollar can result in a ten million dollar win, a lottery ticket that is purchased for two dollars can result in a twenty million dollar win, a lottery ticket that is purchased for three dollars can result in a thirty million win, etc. The difference in increments is not limited to a set increment. For instance, in the example above, a ten million dollar increment existed between the advertised winnings for each price category of tickets. However, any increment can be used. For instance, a lottery ticket that is purchased for one dollar can result in a ten million dollar win, a lottery ticket that is purchased for two dollars can result in a twenty million dollar win, a lottery ticket that is purchased for three dollars can result in a forty million dollar win, etc. In one embodiment, a larger increment can be used to induce purchase of a higher sale ticket.

Each price category can be associated with a percentage of a jackpot. For instance, a one dollar ticket can win twenty five percent of the jackpot, a two dollar ticket can win fifty percent of the jackpot, and a three dollar ticket can win one hundred percent of the jackpot. In one embodiment, the actual winnings are not limited to the advertised winnings. The jackpot can increase with a percentage of each ticket sale being contributed to the jackpot. For instance, if the one dollar ticket winner is the only winner, the one dollar ticket winner can win twenty five percent of a larger jackpot than initially advertised. In effect, the one dollar ticket winner is winning more than twenty five percent of the initial jackpot.

The prizes are won from a single pool. For instance, even if the revenues for the one dollar ticket do not cover the ten million dollar prize, the combined revenues of the one dollar and the two dollar tickets are likely to cover the ten million dollar prize and vice versa. In one embodiment, a shared multiple pricing lottery game with a single predetermined jackpot is disclosed. For example, a lottery player having a one dollar ticket attempting to win ten million dollars and a lottery player having a two dollar ticket attempting to win twenty million dollars can both win a prize. The lottery player having the one dollar ticket will receive a portion of the ten million dollar prize and will have to share the other portion with the lottery player having the two dollar ticket. Accordingly, the two dollar ticket holder receives the remaining portion of the ten million dollars and an additional ten million dollars because the two dollar ticket holder would have been entitled to twenty million dollars if the two dollar ticket holder won the lottery alone. The shared multiple pricing lottery game is not limited to one dollar and two dollar tickets. For example, a three dollar ticket could also be provided. The three dollar ticket holder would share the lottery prize with the two dollar ticket holder and the one dollar ticket holder in a similar manner to which the two dollar ticket holder shared the lottery prize with the one dollar ticket holder.

The average revenue per ticket sold of the multiple pricing revenues can result in higher revenue than traditional lottery systems. A lottery may be able to cut down on expenses by paying less to ticket holders that purchase the inexpensive tickets while at the same time attracting more ticket holders who will only play if the jackpot is large. The multiple pricing system can be used independently or in conjunction with the entity as discussed above.

In one embodiment, fixed prizes can be offered in addition to or without the jackpot prize. A fixed prize is a prize that is not shared. If a lottery player has the winning number for a fixed prize, the lottery player receives the entire fixed prize. If multiple lottery players have the winning numbers for the fixed prize, then multiple lottery players each receive the entire fixed prize without having to share the fixed prizes with the other players. The fixed prize is different from the jackpot prize in which multiple winners share the jackpot prize. The fixed prizes can be distributed in entirety to multiple players because the fixed prizes are generally much smaller than the jackpot prize. In one embodiment, the fixed prize can be the jackpot prize. Multiple players could win the jackpot prize without having to share the jackpot prize.

FIG. 1 illustrates a single priced lottery system 100 that is based on a pari-mutuel model. A lottery operator 102 establishes the lottery. The lottery operator 102 can be a jurisdiction such as a state, city, town, municipality, or any division or department thereof. Further, the lottery operator 102 can be a private organization that a jurisdiction hires to coordinate the lottery. The lottery operator 102 can also be a private organization that is not hired by a jurisdiction. The coordination involved can include establishment, maintenance, and/or winnings determination.

The lottery operator 102 can advertise that a lottery has a prize. For example, the lottery operator 102 can advertise that the lottery prize will be a minimum of ten million dollars. The lottery operator 102 provides the lottery prize from a jackpot 104. The lottery operator 102 can also provide a fixed prize 106. In one embodiment, ticket holders 108 purchase tickets at a price of $x per ticket from a ticket seller 110. The ticket seller then sends the ticket numbers on each of the tickets to the lottery operator 102. If one of the ticket holders 108 wins the lottery, the lottery operator 102 disburses the jackpot 104 to the ticket holder 108. On the other hand, if multiple ticket holders 108 win the lottery, the multiple ticket holders with the winning tickets split the jackpot 104. For instance, FIG. 1 illustrates two ticket holders 108 winning the lottery. The lottery operator 102 then splits the jackpot 104 and distributes half of the jackpot to each of the ticket holders 108.

The lottery operator 102 can also distribute a fixed prize 106. A ticket holder 108 can win a fixed prize that the ticket holder 108 does not have to share with other ticket holders 108. For instance, if multiple ticket holders 108 won the fixed prize 106, the lottery operator 102 would distribute the fixed prize 106 in its entirety to each of the multiple ticket holders 108 that won the fixed prize 106.

In one embodiment, the lottery operator 102 can use a random number generator (not shown) to determine the winning number. In another embodiment, the lottery operator 102 can use a ball draw machine to randomly select the winning number.

One of the difficulties of the single priced lottery system 100 is that the single priced lottery system 100 does not optimize the price paid for a lottery ticket and the payment of the jackpot 104. Some ticket holders 108 may want to purchase a less expensive lottery ticket even if the associated prize is relatively small. Further, some ticket holders 108 may not wish to purchase a lottery ticket unless the jackpot 104 is very large. These ticket holders 108 may be willing to pay more for a lottery ticket that provides a large prize. Further, some ticket holders 108 generally buy lottery tickets in almost any lottery regardless of the size of the jackpot 104. The single price lottery system 100 is not optimized to provide lottery tickets at a price with an associated lottery prize.

Figure 2:
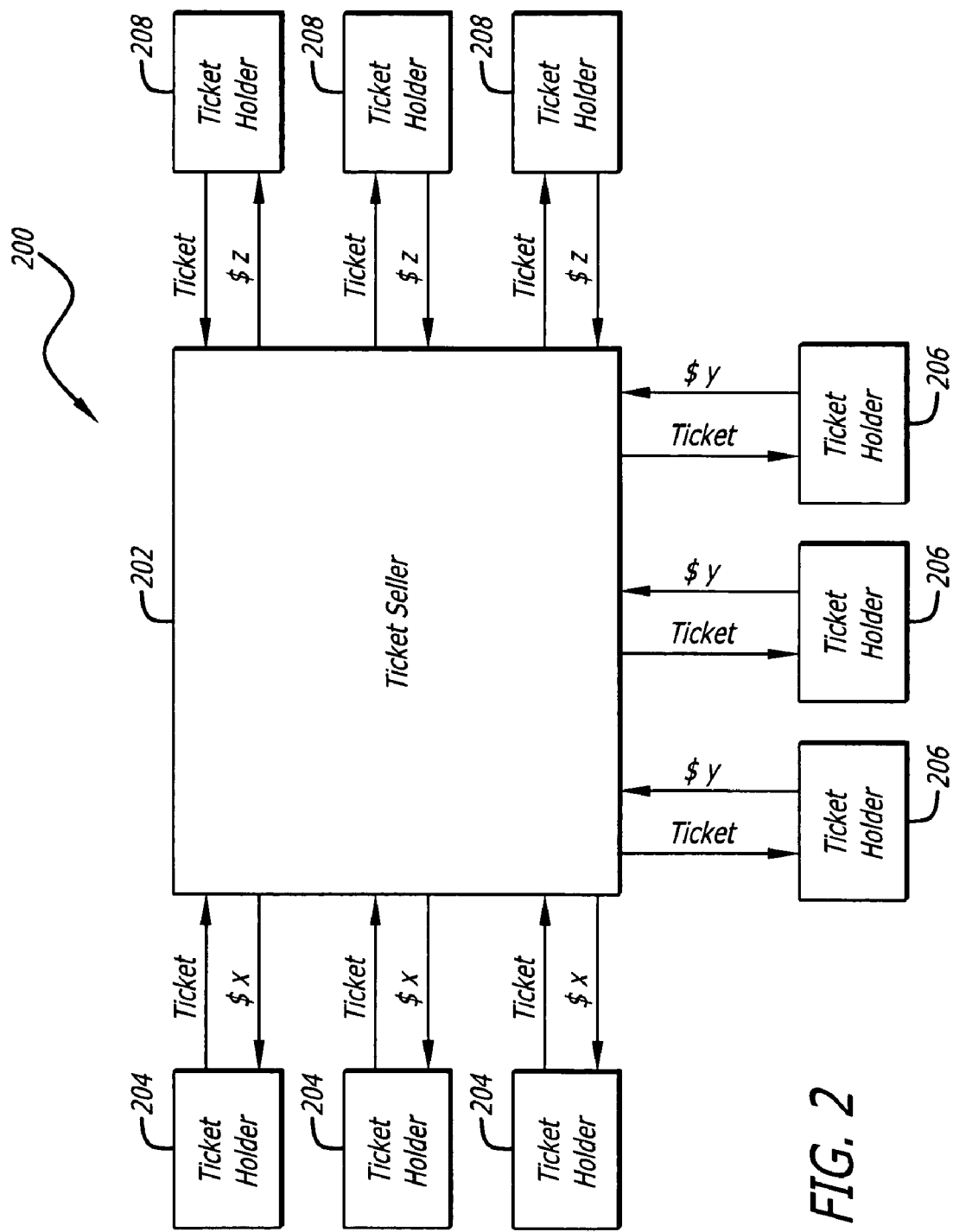
FIG. 2 illustrates a shared multiple priced single pool lottery system.

FIG. 2 illustrates a shared multiple priced single pool lottery system 200. A ticket seller 202 provides lottery tickets according to different price categories. A ticket holder 204 can purchase a lottery ticket in a first price category. For instance, the first price category can be lottery tickets purchased for $x. The first price category is associated with a first percentage of a lottery prize that can be won. For example, the ticket holder 204 may have purchased the lottery ticket for one dollar in order to win twenty five percent of the jackpot. In one embodiment, the advertised jackpot is increased with a percentage of ticket sales revenue. Therefore, the ticket holder 204 can win twenty five percent of a larger jackpot than initially advertised. In one embodiment, the jackpot is increased with a percentage of the revenue from each ticket sold. In other words, a minimum amount of ticket sales is not required for the contribution of ticket sales revenue into the jackpot. The addition of a percentage of ticket sales to the jackpot is a progressive jackpot. In essence, a variable prize is offered with a progressive jackpot. The prize can increase with each ticket sale. In one embodiment, the prize increases with a portion of the ticket sales. In another embodiment, the progressive jackpot can be divided among multiple winners. In one embodiment, a minimum amount of ticket sales is not required. The lottery prize can be a variable prize from the outset. A percentage of each ticket sale can be contributed to the variable prize jackpot.

In one embodiment, the progressive model can be applied so that each price category benefits. If the jackpot increases in size, winnings for each price category can increase because the jackpot increases.

In one embodiment, if the only winning lottery ticket or winning lottery tickets are in the first price category, then the first percentage is distributed according to a first price category intra-sharing distribution formula. In one embodiment, the first price category intra-sharing distribution formula requires an even distribution among all the winners in the first price category. In the example above, if two ticket holders 204 have winning ticket numbers, the two ticket holders 204 share the first percentage evenly. In the example, the first percentage of the prize was twenty five percent.

Therefore, the two ticket holders 204 would each receive twelve and one half percent of the prize. In one embodiment, if the ticket holder 204 is the only winning ticket in the lottery, the first price category intra-sharing distribution formula provides the entirety of the first percentage of the prize to the ticket holder 204. In this example, the ticket holder 204 would receive twenty five percent of the prize.

In another embodiment, the first price category intra-sharing distribution formula can be weighted in favor of previous ticket purchases. For example, if two ticket holders 204 are the only ticket winners in the lottery, one of the ticket holders 204 may have purchased one hundred lottery tickets in previous lotteries where as the other one of the ticket holders 204 may have purchased a lottery ticket for the first time. The first price category intra-sharing distribution formula can include a frequent lottery variable that would provide a larger portion of the first percentage to the ticket holder 204 that previously purchased one hundred tickets. For example, the ticket holder 204 that purchased one hundred tickets may receive twenty percent of the prize where as the ticket holder 204 that only purchased one ticket may receive only five percent of the prize. This is only one example. The frequent lottery variable can also provide a small change. For instance, the ticket holder 204 that purchased one hundred tickets may receive thirteen percent of the prize and the thicket holder 204 that purchased one ticket may receive twelve percent prize. The lottery operator 102 may find that use of the frequent lottery variable provides more incentive to ticket holders 204 to participate in the lottery. The first price category intra-sharing distribution formula can be determined according to consumer demand. One of ordinary skill in the art will recognize that a variety of formulae can be used for weighting the distribution. The first price category intra-sharing distribution formula can be a variable, a ratio, etc.

In one embodiment, the lottery prize is a jackpot. In alternative embodiments, other types of prizes can be used. The prize is not limited to jackpots.

FIG. 2 also illustrates that a ticket holder 206 can purchase a lottery ticket in a second price category. For instance, the second price category can be lottery tickets purchased for $y. The second price category is associated with a second percentage of a lottery prize that can be won. For example, the ticket holder 206 may have purchased the lottery ticket for two dollars in order to win fifty percent of the jackpot. In one embodiment, if the only winning lottery ticket or winning lottery tickets are in the second price category, then the second percentage is distributed according to a second price category intra-sharing distribution formula. In one embodiment, the second price category intra-sharing distribution formula requires an even distribution among all the winners in the second price category. In the example above, if two ticket holders 206 have winning ticket numbers, the two ticket holders 206 share the second percentage evenly. In the example, the second percentage of the prize was fifty percent. Therefore, the two ticket holders 206 would each receive twenty five percent of the prize. In one embodiment, if the ticket holder 206 is the only winning ticket in the lottery, the second price category intra-sharing distribution formula provides the entirety of the second percentage of the prize to the ticket holder 206. In this example, the ticket holder 206 would receive fifty percent of the jackpot.

In one embodiment, the second price category intra-sharing distribution formula is weighted. The second price category intra-sharing distribution formula can be weighted in a similar manner as the first price category intra-sharing distribution formula. For instance, a frequent lottery variable can be used. One of ordinary skill in the art will recognize that a variety of formulae can be used for weighting the distribution. The second price category intra-sharing distribution formula can be a variable, a ratio, etc.

In one embodiment, if a ticket holder 204 and a ticket holder 206 have winning lottery tickets, an inter-sharing distribution formula is used to determine how the ticket holder 204 and the ticket holder 206 should share the jackpot. In one embodiment, the lottery operator 102 splits the first percentage so that the ticket holder 204 receives half of the first percentage and the ticket holder 206 receives half of the first percentage. The ticket holder 206 additionally receives the second percentage minus the first percentage. For example, if the first percentage is twenty five percent and the second percentage is fifty percent, the ticket holder 204 would receive twelve and one half percent. The ticket holder 206 would receive twelve and one half percent in addition to twenty five percent. Therefore, the ticket holder 206 would receive thirty seven and one half percent. The inter-sharing distribution formula is not limited to an even distribution. In one embodiment, the inter-sharing distribution formula is weighted to favor the higher price category. In other words, the ticket holder 206 may be rewarded for paying a higher ticket price. For example, the ticket holder 204 may only receive one third of the twenty five percent with the ticket holder 206 receiving two thirds of the twenty five percent in addition to an entire twenty five percent.

Although each ticket price is associated with a percentage of the jackpot, the winnings come from a single jackpot. In the example above, even if only one ticket is purchased in the first price category, the ticket holder 204 that has the winning number gets to receive twenty five percent of a jackpot that is mostly funded by other price categories. Variations may occur from lottery to lottery in the numbers of tickets purchased in each price category. The lottery operator 102 increases the chances that the jackpot will be sufficient to cover winnings in each of the price categories by having a single pool from which disbursements are made for winnings in any of the price categories. The use of the single pool for multiple priced lottery tickets can be used independently of the sharing methodology discussed above. However, the lottery operator 102 can further optimize the costs associated with the lottery by using the single pool in conjunction with the sharing methodology. Further, the intra-sharing methodology can be used independently of the inter-sharing methodology. However, the lottery operator 102 can optimize costs by using the intra-sharing methodology in conjunction with the inter-sharing methodology.

FIG. 2 also illustrates that a ticket holder 208 can purchase a lottery ticket in a third price category. For instance, the third price category can be lottery tickets purchased for $z. The third price category is associated with a third percentage of a lottery prize that can be won. For example, the ticket holder 208 may have purchased the lottery ticket for three dollars in order to win one hundred percent of the jackpot. In one embodiment, if the only winning lottery ticket or winning lottery tickets are in the third price category, then the third percentage is distributed according to a third price category intra-sharing distribution formula. In one embodiment, the third price category intra-sharing distribution formula requires an even distribution among all the winners in the third price category. In the example above, if two ticket holders 208 have winning ticket numbers, the two ticket holders 208 share the third percentage evenly. In the example, the third percentage of the prize was one hundred percent. Therefore, the two ticket holders 208 would each receive fifty percent of the prize. In one embodiment, if the ticket holder 208 is the only winning ticket in the lottery, the third price category intra-sharing distribution formula provides the entirety of the third percentage of the prize to the ticket holder 208. In this example, the ticket holder 208 would receive one hundred percent of the jackpot.

In one embodiment, the third price category intra-sharing distribution formula is weighted. The third price category intra-sharing distribution formula can be weighted in a similar manner as the first price category intra-sharing distribution formula. For instance, a frequent lottery variable can be used. One of ordinary skill in the art will recognize that a variety of formulae can be used for weighting the distribution. The third price category intra-sharing distribution formula can be a variable, a ratio, etc.

In one embodiment, if the ticket holder 204, the ticket holder 206, and the ticket holder 208 have winning lottery tickets, a first triplet inter-sharing distribution formula is used to determine how the ticket holder 204, the ticket holder 206, and the ticket holder 208 should share the first percentage of the jackpot. In one embodiment, the lottery operator 102 splits the first percentage so that the ticket holder 204 receives one third of the first percentage, the ticket holder 206 receives one third of the first percentage, and the ticket holder 208 receives one third of the first percentage. A second triplet inter-sharing distribution formula is used to determine how the ticket holder 206 and the ticket holder 208 share the second percentage minus the first percentage. In one embodiment, the lottery operator 102 splits the second percentage so that the ticket holder 206 receives one half of the second percentage and the ticket 208 receives the other half of the second percentage. The ticket holder 208 additionally receives the third percentage minus the second percentage. For example, if the first percentage is twenty five percent, the second percentage is fifty percent, and the third percentage is one hundred percent, the ticket holder 204 would receive eight and one third percent. The ticket holder 206 would receive eight and one third percent in addition to twelve and one half percent. Therefore, the ticket holder 206 would receive twenty and five sixths percent. Finally, the ticket holder 208 would receive eight and one third percent in addition to twelve and one half percent in addition to fifty percent. Therefore, the ticket holder 208 would receive seventy and five sixths percent.

The first triplet inter-sharing distribution formula can require an even distribution of the first percent. However, in one embodiment, the first triplet inter-sharing distribution formula can be weighted. The ticket holder 206 can be given a greater portion of the first percent than the ticket holder 204. Further, the ticket holder 208 can be given a greater portion of the first percentage than the ticket holder 206. However, different variations are possible. A frequent lottery variable can be used to determine weighting. In other words, the ticket holder 204 could potentially receive the largest portion of the first percentage if the ticket holder 204 has purchased the most lottery tickets in the past. Further, the ticket holder 204 may receive the largest weighting of the first percent to give incentive to the ticket holder 204 because the ticket holder 204 does not get to receive a portion of the second percentage or of the third percentage. Accordingly, the ticket holder 206 may receive a greater weighted portion of the second percentage than the ticket holder 208 because the ticket holder 206 does not receive a portion of the third percentage. These weighted variations can also be used with the second triplet inter-sharing distribution formula.

The example above discusses the possibility of having one winning ticket from each price category. In one embodiment, multiple ticket winners exist in some or all of the different price categories. A divided intra-sharing distribution within each price category is applied so that winners in each price category, split the winnings according to a divided intra-sharing distribution formula. In the example above, the ticket holder 204 received eight and one third percent. In one embodiment, a first divided intra-sharing distribution formula determines how to split the winnings for the first percentage. For instance, in the example above, if two ticket holders 204 had winning numbers, one of the ticket holders 204 could receive approximately four and sixteen one hundredths percent and the other ticket holder 204 would also receive approximately four and sixteen one hundredths percent. In one embodiment, a second divided intra-sharing distribution formula determines how to split the winnings for the second percentage. For instance, in the example above, if two ticket holders 206 had winning numbers, one of the ticket holders 206 would receive ten and three twelfths percent and the other ticket holder 206 would also receive ten and three twelfths percent. In one embodiment, a third divided intra-sharing distribution formula determines how to split the winnings for the third percentage. For instance, in the example above, if two ticket holders 208 had winning numbers, one of the ticket holders 208 would receive thirty five and three twelfths percent while the other one of the ticket holders 208 would also receive thirty five and three twelfths percent. The divided intra-shared distributions do not have to be the same across price categories. Further, within price categories, the divided intra-shared distributions can be weighted as discussed above with respect to the intra-sharing distributions.

Although, in the above discussion, the first price category was associated with the ticket holder 204, the second price category with the ticket holder 206, and the third price category with the ticket holder 208, the ticket holders can be associated with different price categories. For instance, the first price category may be associated with the ticket holder 204 and the third price category may be associated with the ticket holder 206. The inter-sharing distribution variable as discussed above could be used to share the jackpot if the ticket holder 204 and the ticket holder 206 were the only winning tickets. For instance, the ticket holder 204 would receive one half of twenty five percent. The ticket holder 206 would receive one half of twenty five percent in addition to seventy five percent. Further, the methodologies discussed above can be extended to any number of price categories. For instance, there could be a fourth price category. Any number of price categories can be used.

In one embodiment, the shared multiple priced single pool lottery system 200 can be used with a video lottery game. In another embodiment, the shared multiple priced single pool lottery system 200 can be used with online lotteries that are provided on a network such as the Internet.

In one embodiment the shared multiple priced single pool lottery system 300 can be computerized. Software modules can be used to establish and coordinate the multiple priced single pool lottery system. The use of computerized technologies can help facilitate calculating the sharing distributions. Without the computerized technologies, the quantity of the calculations could be burdensome.

A first price category module can provide a first price category in which a plurality of first price category lottery tickets can be purchased. Further, a second price category module can provide a second price category in which a plurality of first price category lottery tickets can be purchased. In addition, a random number selection module can randomly select the winning lottery number. The random number selection module can be a random number generator, can be couple to a ball draw machine, or can simulate a ball draw machine. A first price intra-shared distribution module provides a first price category intra-shared distribution of the first percentage of the prize if at least one of the lottery tickets in the plurality of first price category lottery tickets has a winning number. Further, a second price category intra-shared distribution module provides a second price category intra-shared distribution of the second percentage of the prize if at least one of the lottery tickets in the plurality of second price category lottery tickets has a winning number. Additional intrashared distribution modules can be used for additional price categories.

In one embodiment, a divided first price category intra-shared distribution module provides a divided first price category intra-shared distribution of the first percentage of the prize. In addition a divided second price category intra-shared distribution module provides a divided second price category intra-shared distribution of the second percentage of the prize. An inter-shared distribution module provides an inter-shared distribution of the first percentage of the prize if at least one of the lottery tickets in the plurality of first price category lottery tickets has a winning number and if at least one of the lottery tickets in the plurality of second price category lottery tickets has a winning number.

Figure 3:
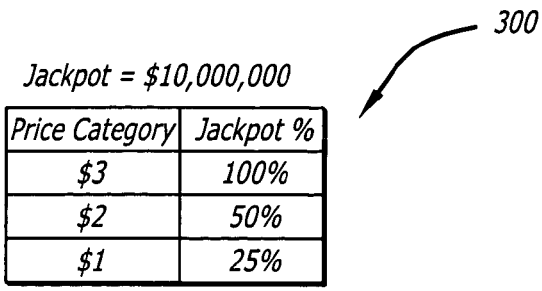
FIG. 3 illustrates an example of a winnings table for the shared multiple priced single pool lottery system of FIG. 2.

FIG. 3 illustrates an example of a winnings table 300 for the shared multiple priced single pool lottery system of FIG. 2. For example, a lottery can have a jackpot of ten million dollars. Lottery players can purchase a one dollar ticket, a two dollar ticket, and a three dollar ticket. The one dollar ticket only gives the ticket holder a chance at receiving twenty five percent of the jackpot. Therefore, the one dollar ticket holder could at best receive two million five hundred thousand dollars if the one dollar ticket holder did not have to share the jackpot with any other winners. The two dollar ticket holder could at best receive five million dollars if the two dollar ticket holder does not have to share the jackpot with any other ticket holders. Finally, the three dollar ticket holder could at best receive the full jackpot of ten million dollars if the three dollar ticket holder does not have to share the jackpot with any other ticket holders.

Figure 4:
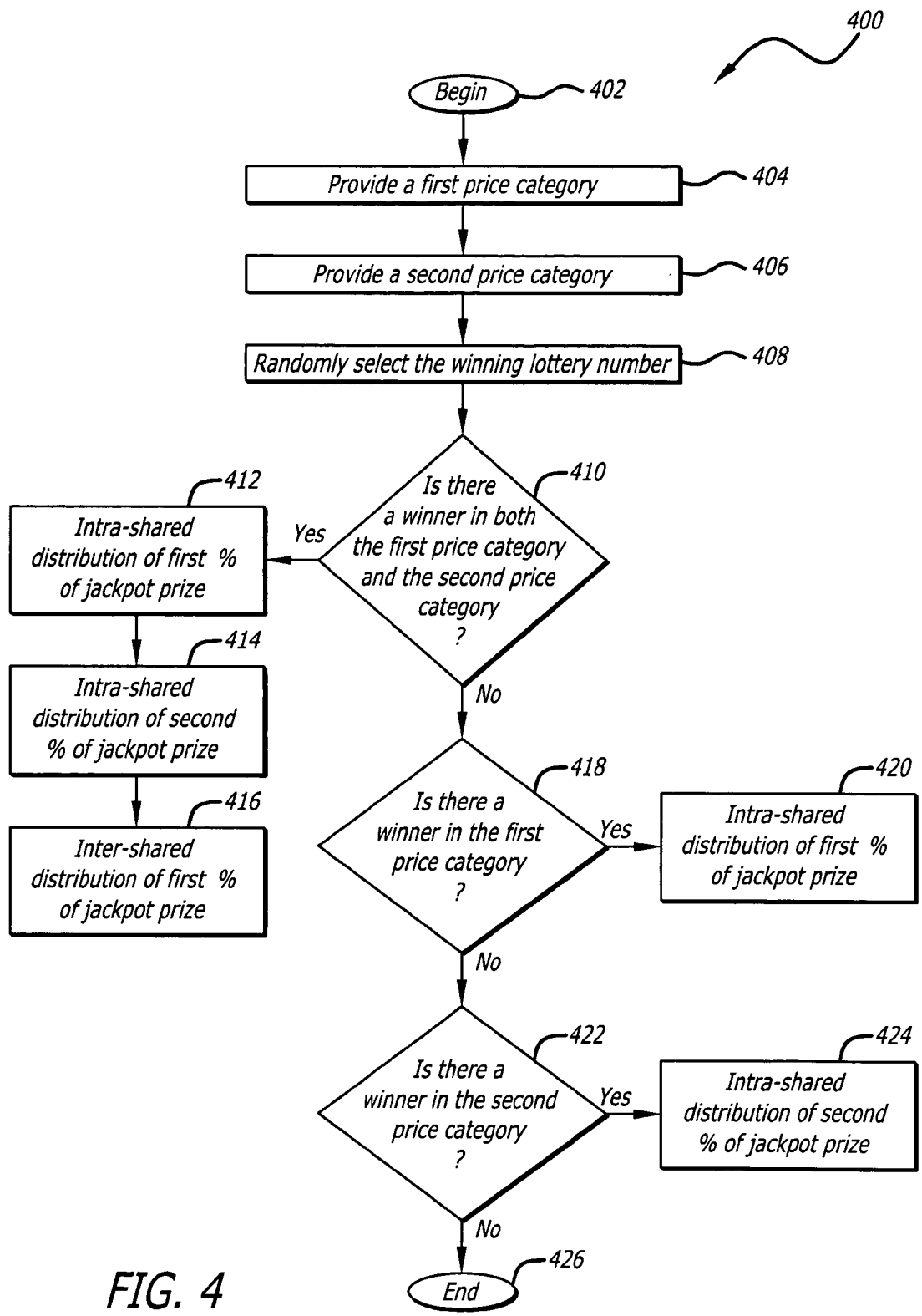
FIG. 4 illustrates a process that can be used with the shared multiple priced single pool lottery system illustrated in FIG. 2.

FIG. 4 illustrates a process 400 that can be used with the shared multiple priced single pool lottery system 200 illustrated in FIG. 2. The process 400 begins at a process block 402. The process 400 advances to a process block 404 to provide a first price category. Further, the process 400 then advances to a process block 406 to provide a second price category. The process then advances to a process block 408 to randomly select the winning lottery number. The process 400 then advances to a decision block 410 where it is determined whether there is a winner in both the first price category and the second price category. If there is a winner in both the first price category and the second price category, then the process 400 advances to a process block 412 where the first percentage of the jackpot prize is distributed through an intra-shared distribution as discussed in FIG. 2. The process 400 then advances to a process block 414 where the second percentage of the jackpot prize is distributed through an intra-shared distribution as discussed in FIG. 2. The process 400 then advances to a process block 416 where the first percentage is distributed through an inter-shared distribution of the jackpot so that the winning ticket holders in the second price category receive the appropriate share of the first percentage.

If the decision block 410 determines that there is not both a winner in the first price category and a winner in the second price category, the process 400 advances to a decision block 418. At the decision block 418, the process 400 determines if there is a winner in the first price category. If there is a winner in the first price category, the process 400 advances to a process block 420 where the process 400 distributes the jackpot prize through an intra-shared distribution to a winner or winners in the first price category. If the decision block 418 determines that there is not a winner in the first price category, the process 400 advances to a decision block 422 to determine if there is a winner in the second price category. If there is a winner in the second price category, the process 400 advances to a process block 424 where the process 400 distributes the jackpot prize through an intra-shared distribution to winners in the second price category. If there is not a winner in the second price category, the process 400 determines that there are not any winners and the process ends at process block 426. In one embodiment, there is a roll over. In one embodiment, the jackpot is used in a future draw. In one embodiment, the roll over includes a percentage of the jackpot for use in a future draw. In one embodiment, the lottery operator 102 takes a percentage of the ticket sales revenue and adds that percentage to a future lottery jackpot even if there is a winner in the present jackpot. The process 400 can be extended to cover three price categories. Further, the process 400 can be extended to cover any number of price categories. In one embodiment, the process 400 can be implemented on a computer readable medium.

Figure 5:
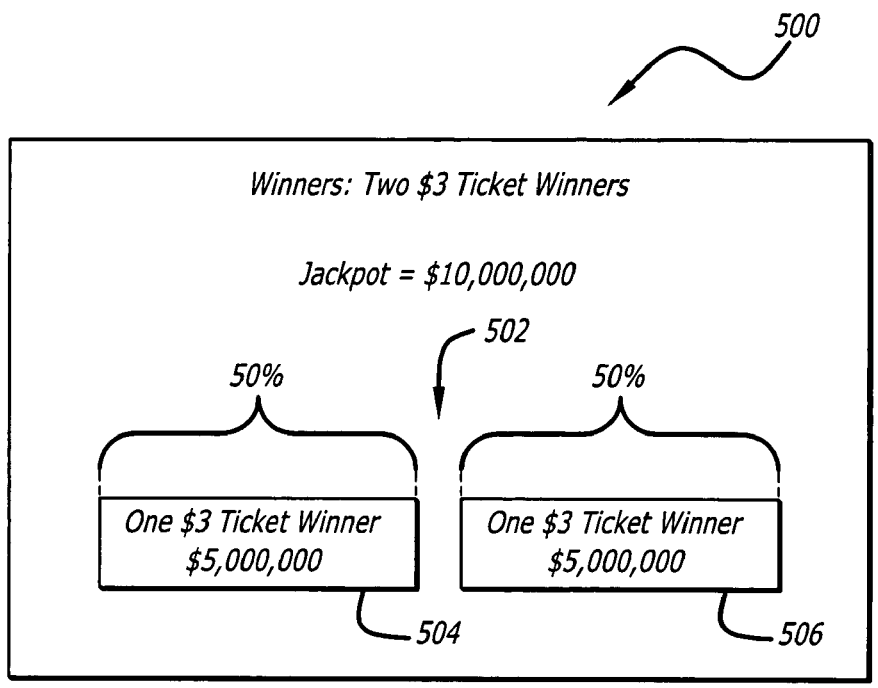
FIG. 5 illustrates an example of a winnings table of a lottery having two three dollar ticket winners.

FIGS. 5 through 8 illustrate various examples of the multiple priced single prize lottery system 200. FIG. 5 illustrates an example of a winnings table 500 of a lottery having two three dollar ticket winners. The jackpot is for ten million dollars. The distribution displays one three dollar ticket winner sharing the ten million dollar jackpot with another three dollar ticket winner through an intra-sharing distribution. One of the three dollar ticket winner receives five million dollars at a sharing section 504. Further, the other three dollar ticket winner receives five million dollars at a sharing section 506.

Figure 6:
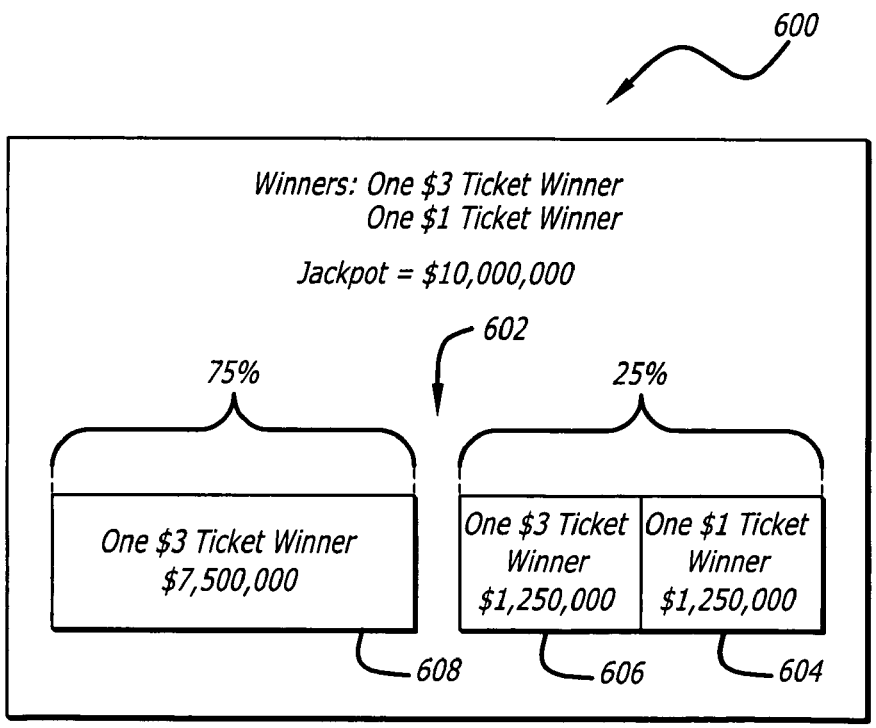
FIG. 6 illustrates an example of a winnings table of a lottery having one three dollar ticket winner and one one dollar ticket winner.

FIG. 6 illustrates an example of a winnings table 600 of a lottery having one three dollar ticket winner and one one dollar ticket winner. The jackpot is for ten million dollars. The distribution 602 displays one three dollar ticket winner that shares the jackpot with one one dollar ticket winner. The one dollar ticket winner receives one million two hundred fifty thousand dollars at a section 604 through an intra-sharing distribution. Further, the three dollar ticket winner receives one million two hundred fifty thousand dollars through an intra-sharing distribution at an intra-sharing section 606. Finally, the three dollar ticket winner receives seven million five hundred thousand dollars at a section 608 through an inter-shared distribution.

Figure 7:
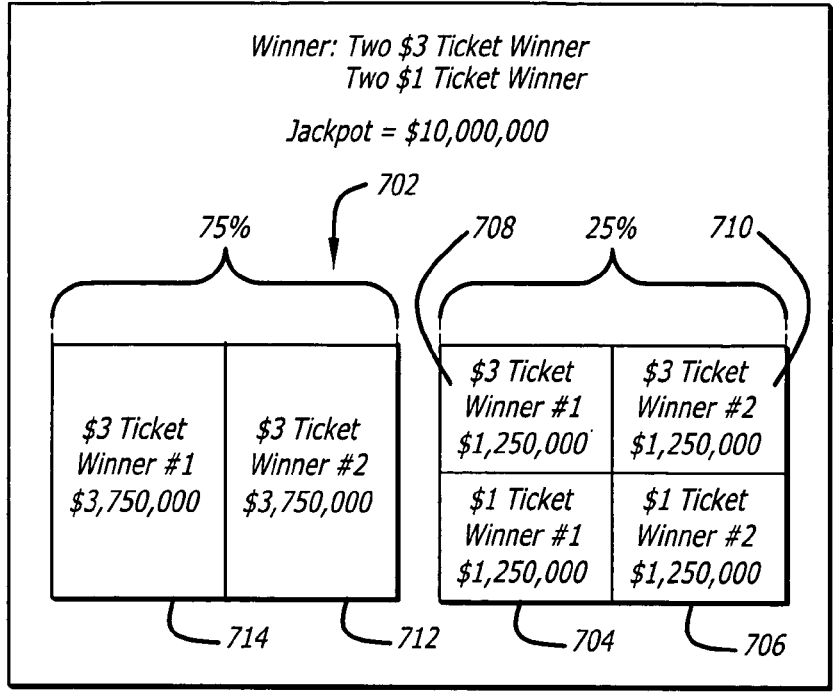
FIG. 7 illustrates an example of a winnings table of a lottery having two three dollar ticket winners and two one dollar ticket winners.

FIG. 7 illustrates an example of a winnings table 700 of a lottery having two three dollar ticket winners and two one dollar ticket winners. The jackpot is for ten million dollars. A distribution 702 displays a one dollar winner receiving one million two hundred fifty thousand dollars in a section 704, a one dollar winner receiving one million two hundred fifty thousand dollars in a section 706, a three dollar winner receiving one million two hundred fifty thousand dollars at a section 708, and a three dollar winner receiving one million two hundred fifty thousand dollars at a section 710. The one dollar ticket winners receive their winnings through an intra-shared distribution. Further, the three dollar ticket winners receive a portion of the twenty five percent associated with the first price category through an inter-shared distribution and then received a divided intra-shared portion of half of the twenty five percent. Further, each of the three dollar ticket holders receives an additional three million seven hundred fifty thousand dollars through an intra-shared distribution of the one hundred percent minus the twenty five percent.

Figure 8:
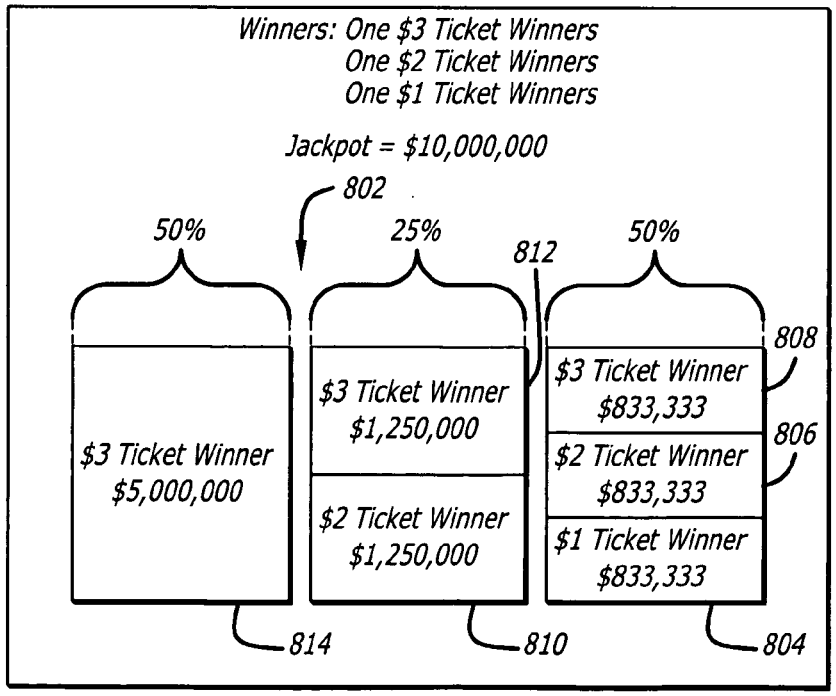
FIG. 8 illustrates an example of a winnings table of a lottery having one three dollar ticket winner, one two dollar ticket winner, and one one dollar ticket winner.

FIG. 8 illustrates an example of a winnings table 800 of a lottery having one three dollar ticket winner, one two dollar ticket winner, and one one dollar ticket winner. The jackpot is for ten million dollars. A distribution 802 displays a one dollar winner receiving eight hundred thirty three thousand dollars in a section 804 according to an inter-shared distribution of twenty five percent of the jackpot. The two dollar ticket holder also receives eight hundred thousand thirty three dollars in a section 806 according to the inter-shared distribution of twenty five percent of the jackpot. Accordingly, the three dollar ticket holder also receives eight hundred thousand thirty three dollars in a section 808 according to the inter-shared distribution of twenty five percent of the jackpot. Further, the two dollar ticket holder receives an additional one million two hundred fifty thousand dollars at a sharing section 810 through an inter-shared distribution of the second price category. In addition, the three dollar ticket holder receives an additional one million two hundred fifty thousand dollars at a sharing section 812 through an inter-shared distribution of the second price category. Finally, the three dollar ticket holder receives an additional five million dollars at a section 814 because the third percentage minus the second percentage equals fifty percent. In one embodiment, the ticket holder in the highest price category receives the percentage associated with the highest price category minus the next highest percentage of a winning ticket without an inter-sharing distribution. Intra-sharing distribution may occur in this remainder. Alternative embodiments will allow for different methodologies for calculating the remainder.

Figure 9:
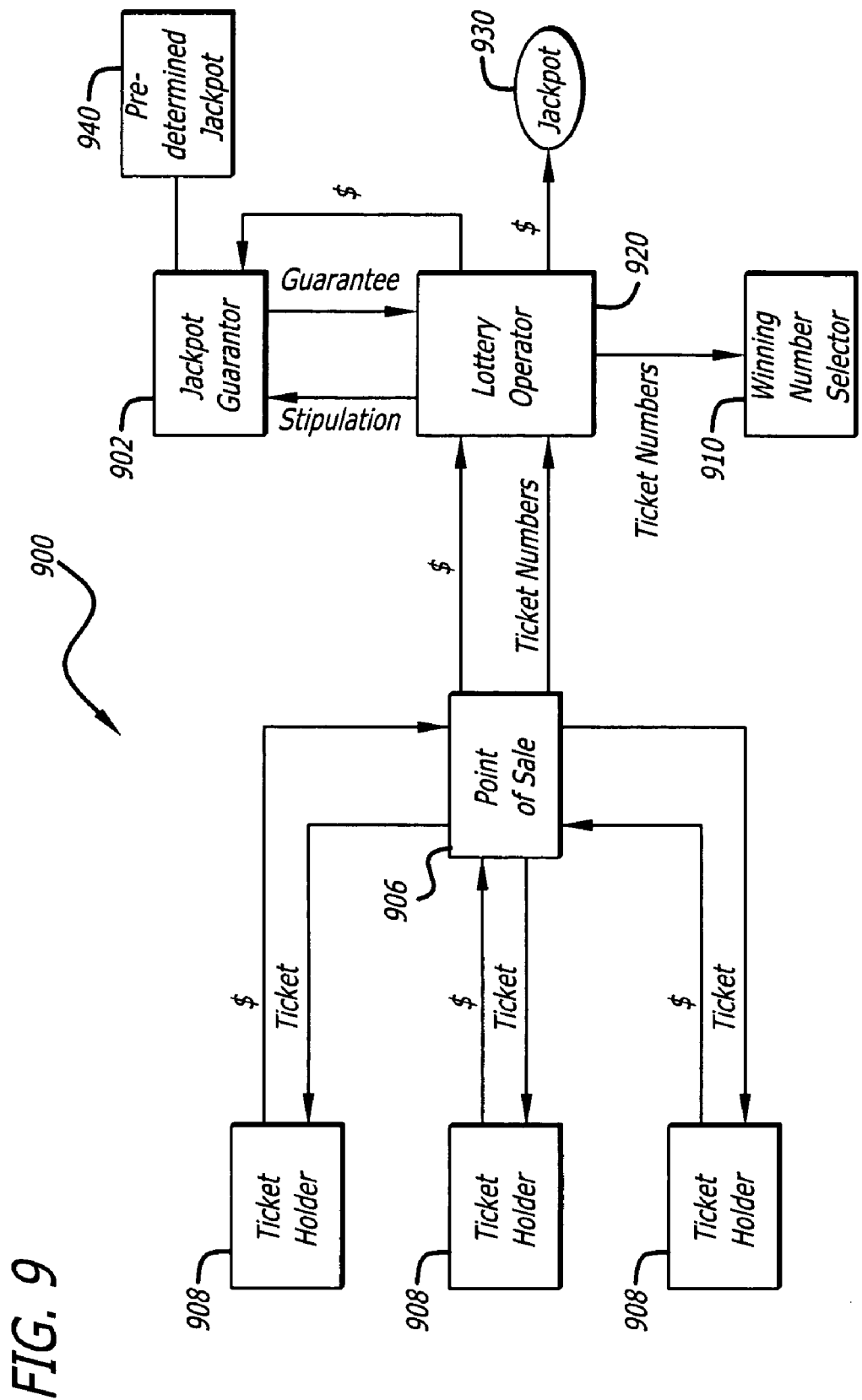
FIG. 9 illustrates a probabilistic lottery system.

FIG. 9 illustrates a probabilistic lottery system 900. The multiple pricing shared lottery system 200 can be used in conjunction with the probabilistic lottery system 900. A jackpot guarantor 902 assumes the risk that would normally be assumed by the lottery operator 920. In one embodiment, the jackpot guarantor 902 is a private organization other than a jurisdiction. In another embodiment, the jackpot guarantor is a publicly held company other than a jurisdiction. The jackpot guarantor 902 establishes a pre-determined jackpot 940. In one embodiment, the pre-determined jackpot 204 is a very large prize that will invoke ticket holders 108 that would not normally purchase a lottery ticket to purchase a lottery ticket. The lottery operator 920 can advertise with the pre-determined jackpot 204 in order to invoke higher ticket sales than would otherwise be achieved. In one embodiment, the pre-determined jackpot 940 does not actually contain any funds. Rather, the jackpot guarantor 902 determines the pre-determined jackpot 940 that is large enough so that there is a low probability of generating ticket sales that are less than the pre-determined jackpot 940. If the ticket sales are less than the pre-determined jackpot 940, the jackpot guarantor 902 assumes the risk for paying the difference between the ticket sales and the pre-determined jackpot 930.

In one embodiment, the jackpot guarantor 902 provides a guarantee to the lottery operator 920. In one embodiment, the guarantee provides that the jackpot guarantor 902 assumes the risk for paying the pre-determined jackpot if the ticket sales are not sufficient to cover the pre-determined jackpot. In another embodiment, the guarantee provides that the jackpot guarantor assumes the risk for paying a portion of the pre-determined jackpot for any secondary prizes that are won.

In one embodiment, the jackpot guarantor 902 provides the guarantee in exchange for a stipulation. In one embodiment, the stipulation includes an obligation by the lottery operator 920 to provide a percentage of revenue generated from future ticket sales in exchange for the guarantee. In another embodiment, the stipulation includes an obligation by the lottery operator 920 to provide a fee in exchange for the guarantee.

The lottery operator 920 receives payments for ticket sales from the point of sale 106. Further, the lottery operator 920 receives ticket numbers from the tickets sold to the ticket holders 108 from the point of sale 906. The lottery operator provides the ticket numbers to the winning number selector 910.

In one embodiment, the jackpot guarantor 902 places the funds in the predetermined jackpot 940. Therefore, the lottery operator can advertise a large prize because another entity actually has the large prize.

Figure 10:
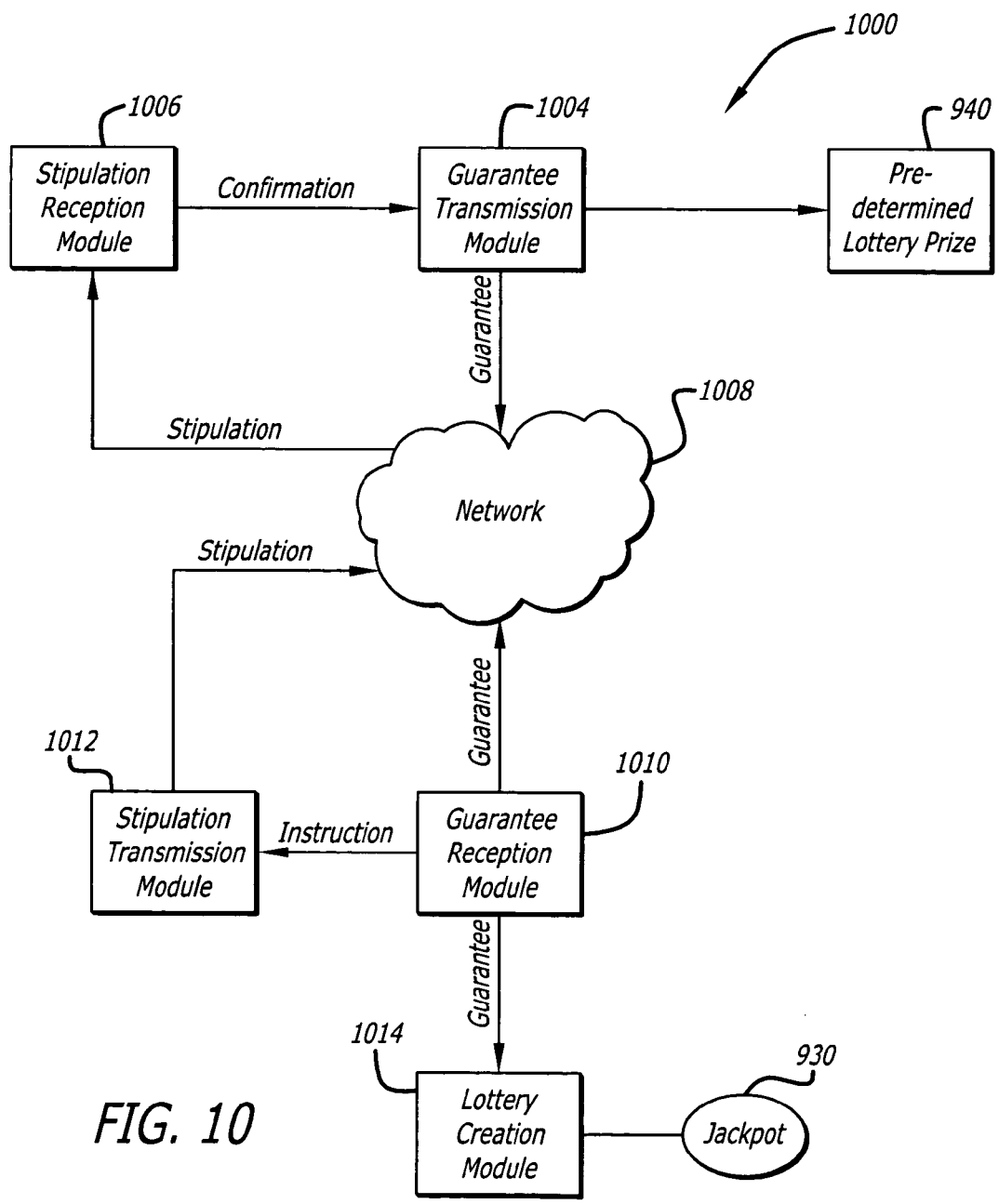
FIG. 10 illustrates a probabilistic software configuration that can be used with the probabilistic lottery system.

FIG. 10 illustrates a probabilistic software configuration 1000 that can be used with the probabilistic lottery system in conjunction with the multiple pricing shared lottery system 200. As can be seen from FIG. 10, the probabilistic software configuration 1000 includes software for establishing a guarantee for a pre-determined lottery prize 940. A guarantee transmission module 404 transmits the guarantee through a network 1008. The network 1008 can be a wide area network, a local area network, the network, a wireless network, or any other network known to one of ordinary skill in the art. The guarantee transmission module 1004 transmits the guarantee in exchange for a stipulation. In one embodiment, the stipulation can be an obligation for a percentage of future ticket sales. A stipulation reception module 1006 receives the stipulation through the network 408. In one embodiment, after the stipulation reception module 1006 receives the stipulation, the stipulation reception module 1006 transmits a confirmation that the stipulation was received to the guarantee transmission module 1004.

A guarantee reception module 1010 receives the guarantee from the network 1008. In one embodiment, upon receiving the guarantee, the guarantee reception module 1010 provides an instruction to a stipulation transmission module 1012. The stipulation transmission module 1012 then sends the stipulation through the network 1008. As discussed above, the stipulation reception module 1006 can receive the stipulation and send the confirmation to the guarantee transmission module 1004 that the guarantee has been sent and the stipulation, in exchange for which the guarantee was sent, has been received.

While the above description contains many specifics, these should not be construed as limitations on the scope of the invention, but rather as an exemplification of preferred embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

What is claimed is:

1. A method for providing a multi-priced shared lottery, the method comprising:
   providing a first price category in which a plurality of first price category lottery tickets can be purchased, wherein the first price category indicates a first known percentage of a prize that can be won with lottery tickets in the plurality of first price category lottery tickets having a winning lottery number;

providing a second price category in which a plurality of second price category lottery tickets can be purchased, wherein the second price category ticket indicates a second known percentage of the prize, distinct from the first known percentage of the prize, that can be won with lottery tickets in the plurality of second price category lottery tickets having the winning number, wherein the prize includes at least a portion of the revenue provided from the plurality of the first price category lottery tickets and at least a portion of the revenue provided from the plurality of the second price category lottery tickets;

randomly selecting the winning lottery number;

providing a first price category intra-shared distribution of the first known percentage of the prize if at least one of the lottery tickets in the plurality of first price category lottery tickets has a winning number, wherein the first category is the only price category having a winning ticket, wherein each of the winning tickets in the plurality of first price category lottery tickets shares the first known percentage of the prize according to a first price category intra-sharing distribution formula;

providing a second price category intra-shared distribution of the second known percentage of the prize if at least one of the lottery tickets in the plurality of second price category lottery tickets has a winning number, wherein the second category is the only price category having a winning ticket, wherein each of the winning tickets in the plurality of second price category lottery tickets shares the second known percentage of the prize according to a second price category intra-sharing distribution formula;

providing a divided first price category intra-shared distribution of the first known percentage of the prize, a divided second price category intra-shared distribution of the second known percentage of the prize, and an inter-shared distribution of the first known percentage of the prize if at least one of the lottery tickets in the plurality of first price category lottery tickets has a winning number and if at least one of the lottery tickets in the plurality of second price category lottery tickets has a winning number, wherein each of the winning tickets in the plurality of first price category lottery tickets shares the first known percentage of the prize according to the divided first price category intra-sharing distribution formula, wherein each of the winning tickets in the plurality of second price category lottery tickets shares the second known percentage of the prize according to the divided second price category intra-sharing distribution formula, wherein each of the winning tickets in the plurality of the second price category lottery tickets shares the first known percentage of the prize with each of the winning tickets in the plurality of the first price category lottery tickets according to an inter-sharing distribution formula.

2. The method of claim 1, wherein the prize is a jackpot.

3. The method of claim 1, wherein the prize is a fixed prize.

4. The method of claim 1, wherein the inter-sharing formula is a weighted distribution that provides a larger portion of the first percentage to winning tickets in the plurality of the second price category lottery tickets.

5. The method of claim 1, further comprising providing a third price category in which a plurality of third price category lottery tickets can be purchased, wherein the third price category indicates a third known percentage of the prize, distinct from the first known percentage of the prize and distinct from the second known percentage of the prize, that can be won with lottery tickets in the plurality of third price category lottery tickets having a winning lottery number.

6. The method of claim 5, further comprising providing a third price category intra-shared distribution of the third known percentage of the prize if at least one of the lottery tickets in the plurality of third price category lottery tickets has a winning number, wherein the third price category is the only price category having a winning ticket, wherein each of the winning tickets in the plurality of third price category lottery tickets shares the third known percentage of the prize according to a third price category intra-sharing distribution formula.

7. The method of claim 6, further comprising providing the divided first price category intra-shared distribution of the first known percentage of the prize, the divided second price category intra-shared distribution of the second known percentage of the prize, the divided third price category intra-shared distribution of the third known percentage of the prize, and the inter-shared distribution of the first known percentage of the prize if at least one of the lottery tickets in the plurality of first price category lottery tickets has a winning number, if at least one of the lottery tickets in the plurality of second price category lottery tickets has a winning number, and if at least one of the lottery tickets in the plurality of third price category lottery tickets has a winning number, wherein each of the winning tickets in the plurality of first price category lottery tickets shares the first known percentage of the prize according to the divided first price category intra-sharing distribution formula, wherein each of the winning tickets in the plurality of second price category lottery tickets shares the second known percentage of the prize according to the divided second price category intra-sharing distribution formula, wherein each of the winning tickets in the plurality of third price category lottery tickets shares the third known percentage of the prize according to the divided third price category intra-sharing distribution formula, wherein each of the winning tickets in the plurality of the second price category lottery tickets and each of the winning tickets in the plurality of the third price category lottery tickets shares the first known percentage of the prize with each of the winning tickets in the plurality of the first price category lottery tickets according to a first triplet inter-sharing distribution formula, wherein each of the winning tickets in the plurality of the third price category lottery tickets shares the second known percentage of the prize with each of the winning tickets in the plurality of the second price category lottery tickets according to a second triplet inter-sharing distribution formula.

8. A method for providing a multi-priced shared lottery, the method comprising:

providing a first price category in which a plurality of first price category lottery tickets can be purchased, wherein the first price category indicates a first known percentage of a prize that can be won with lottery tickets in the plurality of first price category lottery tickets having a winning lottery number, providing a second price category in which a plurality of second price category lottery tickets can be purchased, wherein the second price category ticket indicates a second known percentage of the prize, distinct from the first known percentage, that can be won with lottery tickets in the plurality of second price category lottery tickets having the winning number, wherein the prize includes at least a portion of the revenue provided from the plurality of the first price category lottery tickets and at least a portion of the revenue provided from the plurality of the second price category lottery tickets;

randomly selecting the winning lottery number;

providing a first price category intra-shared distribution of the first known percentage of the prize if at least one of the lottery tickets in the plurality of first price category lottery tickets has a winning number, wherein the first category is the only price category having a winning ticket, wherein each of the winning tickets in the plurality of first price category lottery tickets shares the first known percentage of the prize according to a first price category intra-sharing distribution formula; and providing a second price category intra-shared distribution of the second known percentage of the prize if at least one of the lottery tickets in the plurality of second price category lottery tickets has a winning number, wherein the second category is the only price category having a winning ticket, wherein each of the winning tickets in the plurality of second price category lottery tickets shares the second known percentage of the prize according to a second price category intra-sharing distribution formula.

9. The method of claim 8, further comprising providing a divided first price category intra-shared distribution of the first known percentage of the prize, a divided second price category intra-shared distribution of the second known percentage of the prize, and an inter-shared distribution of the first known percentage of the prize if at least one of the lottery tickets in the plurality of first price category lottery tickets has a winning number and if at least one of te lottery tickets in the plurality of second price category lottery tickets has a winning number, wherein each of the winning tickets in the plurality of first price category lottery tickets shares the first known percentage of the prize according to the divided first price category intra-sharing distribution formula, wherein each of the winning tickets in the plurality of second price category lottery tickets shares the second known percentage of the prize according to the divided second price category intra-sharing distribution formula, wherein each of the winning tickets in the plurality of the second price category lottery tickets shares the first known percentage of the prize with each of the winning tickets in the plurality of the first price category lottery tickets according to an inter-sharing distribution formula.

10. The method of claim 8, wherein the prize is a jackpot.

11. The method of claim 8, wherein the prize is a fixed prize.

12. The method of claim 8, wherein the inter-sharing formula is a weighted distribution that provides a larger portion of the first percentage to winning tickets in the plurality of the second price category lottery tickets.

13. A method for providing a multi-priced shared lottery, the method comprising:

providing a first price category in which a plurality of first price category lottery tickets can be purchased, wherein the first price category indicates a first known percentage of a prize that can be won with lottery tickets in the plurality of first price category lottery tickets having a winning lottery number;

providing a second price category in which a plurality of second price category lottery tickets can be purchased, wherein the second price category ticket indicates a second known percentage of the prize, distinct from the first known percentage, that can be won with lottery tickets in the plurality of second price category lottery tickets having the winning number, wherein the prize includes at least a portion of the revenue provided from the plurality of the first price category lottery tickets and at least a portion of the revenue provided from the plurality of the second price category lottery tickets;

randomly selecting the winning lottery number;

providing a first price category intra-shared distribution of the first known percentage of the prize if at least one of the lottery tickets in the plurality of first price category lottery tickets has a winning number, wherein the first category is the only price category having a winning ticket, wherein each of the winning tickets in the plurality of first price category lottery tickets shares the first known percentage of the prize according to a first price category intra-sharing distribution formula;

providing a second price category intra-shared distribution of the second known percentage of the prize if at least one of the lottery tickets in the plurality of second price category lottery tickets has a winning number, wherein the second category is the only price category having a winning ticket, wherein each of the winning tickets in the plurality of second price category lottery tickets shares the second known percentage of the prize according to a second price category intra-sharing distribution formula;

providing a guarantee of payment of the first price category intra-shared distribution and a guarantee of payment of the second price category intra-shared distribution, wherein the guarantee is in exchange for a stipulation of a percentage of ticket sales revenue from the first price category lottery tickets and from the second price category lottery tickets, wherein the providing the guarantee occurs prior to ticket sales in the lottery; and receiving the percentage of the ticket sales revenue.

14. The method of claim 13, wherein the guarantee ensures that the payment of the prize will be paid even if the ticket sales are not greater in size than the payment.

15. The method of claim 13, wherein the guarantee ensures that the payment of the prize will be paid even if the percentage of the ticket sales revenue is not greater in size than the payment of the prize.

16. A multi-priced shared lottery system comprising:

a first price category module that provides a first price category in which a plurality of first price category lottery tickets can be purchased, wherein the first price category indicates a first known percentage of a prize that can be won with lottery tickets in the plurality of first price category lottery tickets having a winning lottery number;

a second price category module that provides a second price category in which a plurality of second price category lottery tickets can be purchased, wherein the second price category ticket indicates a second known percentage of the prize, distinct from the first known percentage, that can be won with lottery tickets in the plurality of second price category lottery tickets having the winning number, wherein the prize includes at least a portion of the revenue provided from the plurality of the first price category lottery tickets and at least a portion of the revenue provided from the plurality of the second price category lottery tickets;

a random number selection module that randomly selects the winning lottery number;

a first price intra-shared distribution module that provides a first price category intra-shared distribution of the first known percentage of the prize if at least one of the lottery tickets in the plurality of first price category lottery tickets has a winning number, wherein the first category is the only price category having a winning ticket, wherein each of the winning tickets in the plurality of first price category lottery tickets shares the first known percentage of the prize according to a first price category intra-sharing distribution formula; and a second price category intra-shared distribution module that provides a second price category intra-shared distribution of the second known percentage of the prize if at least one of the lottery tickets in the plurality of second price category lottery tickets has a winning number, wherein the second category is the only price category having a winning ticket, wherein each of the wining tickets in the plurality of second price category lottery tickets shares the second known percentage of the prize according to a second price category intra-sharing distribution formula.

17. The multi-priced shared lottery system of claim 16, further comprising a divided first price category intra-shared distribution module that provides a divided first price category intra-shared distribution of the first known percentage of the prize, a divided second price category intra-shared distribution module that provides a divided second known price category intra-shared distribution of the second known percentage of the prize, and an inter-shared distribution module that provides an inter-shared distribution of the first known percentage of the prize if at least one of the lottery tickets in the plurality of first price category lottery tickets has a winning number and if at least one of the lottery tickets in the plurality of second price category lottery tickets has a winning number, wherein each of the winning tickets in the plurality of first price category lottery tickets shares the first known percentage of the prize according to the divided first price category intra-sharing distribution formula, wherein each of the winning tickets in the plurality of second price category lottery tickets shares the second known percentage of the prize according to the divided second price category intra-sharing distribution formula, wherein each of the winning tickets in the plurality of the second price category lottery tickets shares the first known percentage of the prize with each of the winning tickets in the plurality of the first price category lottery tickets according to an inter-sharing distribution formula.

18. The multi-priced shared lottery system of claim 17, further comprising a third price category intra-shared distribution module that provides a third price category intra-shared distribution of a third known percentage of the prize, distinct from the first known percentage of the prize and distinct from the second known percentage of the prize, if at least one of the lottery tickets in the plurality of third price category lottery tickets has a winning number, wherein the third price category is the only price category having a winning ticket, wherein each of the winning tickets in the plurality of third price category lottery tickets shares the third known percentage of the prize according to a third price category intra-sharing distribution formula.

19. The multi-priced shared lottery system of claim 18, further comprising a divided third price category intra-shared distribution module that provides a divided third price category intra-shared distribution of the third known percentage of the prize, if at least one of the lottery tickets in the plurality of first price category lottery tickets has a winning number, if at least one of the lottery tickets in the plurality of second price category lottery tickets has a winning number, and if at least one of the lottery tickets in the plurality of third price category lottery tickets has a winning number, wherein the inter-shared distribution module provides an inter-shared distribution of the first known percentage of the prize, wherein each of the winning tickets in the plurality of first price category lottery tickets shares the first known percentage of the prize according to the divided first price category intra-sharing distribution formula, wherein each of the winning tickets in the plurality of second price category lottery tickets shares the second known percentage of the prize according to the divided second price category intra-sharing distribution formula, wherein each of the winning tickets in the plurality of third price category lottery tickets shares the third known percentage of the prize according to the divided third price category intra-sharing distribution formula, wherein each of the winning tickets in the plurality of the second price category lottery tickets and each of the winning tickets in the plurality of the third price category lottery tickets shares the first known percentage of the prize with each of the winning tickets in the plurality of the first price category lottery tickets according to a first triplet inter-sharing distribution formula, wherein each of the winning tickets in the plurality of the third price category lottery tickets shares the second known percentage of the prize with each of the winning tickets in the plurality of the second price category lottery tickets according to a second triplet inter-sharing distribution formula.

* * * * *